(12) United States Patent
Murata et al.

(10) Patent No.: US 11,099,434 B2
(45) Date of Patent: Aug. 24, 2021

(54) LIQUID CRYSTAL DISPLAY PANEL

(71) Applicant: SHARP KABUSHIKI KAISHA, Sakai (JP)

(72) Inventors: Koji Murata, Sakai (JP); Kohzoh Nakamura, Sakai (JP); Kiyoshi Minoura, Sakai (JP); Akira Sakai, Sakai (JP); Yuichi Kawahira, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/780,559

(22) Filed: Feb. 3, 2020

(65) Prior Publication Data

US 2020/0249532 A1 Aug. 6, 2020

Related U.S. Application Data

(60) Provisional application No. 62/800,732, filed on Feb. 4, 2019.

(51) Int. Cl.
| | |
|---|---|
| *G02F 1/13363* | (2006.01) |
| *G02F 1/1337* | (2006.01) |
| *G02F 1/139* | (2006.01) |
| *G02F 1/1335* | (2006.01) |

(52) U.S. Cl.
CPC ...... *G02F 1/133636* (2013.01); *G02F 1/1393* (2013.01); *G02F 1/133528* (2013.01); *G02F 1/133788* (2013.01)

(58) Field of Classification Search
CPC ......... G02F 1/133636; G02F 1/133528; G02F 1/133788; G02F 1/1393; G02F 2001/134372
See application file for complete search history.

(56) References Cited

U.S. PATENT DOCUMENTS

| | | | | |
|---|---|---|---|---|
| 2008/0068523 | A1* | 3/2008 | Mitsui | G02F 1/133555 349/37 |
| 2012/0273721 | A1* | 11/2012 | Liu | C09K 19/586 252/299.01 |
| 2018/0348553 | A1* | 12/2018 | Koide | G02F 1/133555 |

FOREIGN PATENT DOCUMENTS

| | | |
|---|---|---|
| JP | H09-080383 A | 3/1997 |
| JP | H11-072785 A | 3/1999 |
| JP | 2940354 B2 | 8/1999 |
| JP | 2003-057147 A | 2/2003 |

(Continued)

*Primary Examiner* — Nathanael R Briggs
(74) *Attorney, Agent, or Firm* — ScienBiziP, P.C.

(57) ABSTRACT

A liquid crystal display panel performs displaying in the normally white mode. A first and a second polarizer are disposed so that the transmission axes thereof are perpendicular to each other. A liquid crystal layer is in a twisted alignment state in the absence of an applied voltage. A first substrate has a first electrode having a plurality of rectangular openings extending in parallel to each other, and a second electrode facing the first electrode with a dielectric layer interposed therebetween. The openings each independently have a width S of more than 0.6 μm and not more than 1.4 μm, and each pair of adjacent openings independently has a distance L therebetween of not less than 0.3 μm and not more than 0.7 μm. A first and a second horizontal alignment film each have an azimuthal anchoring energy of not more than $1 \times 10^{-4} J/m^2$.

19 Claims, 10 Drawing Sheets

(56) References Cited

FOREIGN PATENT DOCUMENTS

JP       2007-248958 A     9/2007
JP       2007248958 A  *  9/2007

* cited by examiner

*FIG.3*

| DARK-ROOM CONTRAST RATIO (@0 V/@7 V) | | S (μm) | | | | | | | | |
|---|---|---|---|---|---|---|---|---|---|---|
| | | 0.5 | 0.6 | 0.8 | 0.9 | 1.0 | 1.1 | 1.4 | 1.5 | 3.0 |
| L (μm) | 0.3 | | | | | | | | | |
| | 0.4 | | | | | 223 | | | | |
| | 0.5 | 12 | | | 194 | 253 | 145 | | 27 | |
| | 0.6 | | | | | 211 | | | | |
| | 0.7 | | | | | | | | | |
| | 1.0 | 4 | | | | 14 | | | | |
| | 2.5 | | | | | | | | | 4 |

ANCHORING ENERGY: $1 \times 10^3$ J/m$^2$

*FIG.4*

| DARK-ROOM CONTRAST RATIO (@0 V/@7 V) | | S (μm) | | | | | | | | |
|---|---|---|---|---|---|---|---|---|---|---|
| | | 0.5 | 0.6 | 0.8 | 0.9 | 1.0 | 1.1 | 1.4 | 1.5 | 3.0 |
| L (μm) | 0.3 | | 127 | | | 64 | | 21 | | |
| | 0.4 | | | | | 743 | | 174 | | |
| | 0.5 | 18 | | 410 | 642 | 986 | 374 | | 57 | |
| | 0.6 | | 19 | | | 689 | | | | |
| | 0.7 | | 15 | | | 69 | | 137 | | |
| | 1.0 | 4.2 | | | | 20 | | | | |
| | 2.5 | | | | | | | | | 4.2 |

ANCHORING ENERGY: $1 \times 10^{-4}$ J/m²

*FIG.5*

| DARK-ROOM CONTRAST RATIO (@0 V/@7 V) | | S (μm) | | | | | | | | |
|---|---|---|---|---|---|---|---|---|---|---|
| | | 0.5 | 0.6 | 0.8 | 0.9 | 1.0 | 1.1 | 1.4 | 1.5 | 3.0 |
| L (μm) | 0.3 | | 239 | | | 117 | | 54 | | |
| | 0.4 | | | | | 888 | | 304 | | |
| | 0.5 | 48 | | 672 | 773 | 1008 | 578 | | 108 | |
| | 0.6 | | 52 | | | 841 | | | | |
| | 0.7 | | 38 | | | 156 | | 245 | | |
| | 1.0 | 4.5 | | | | 56 | | | | |
| | 2.5 | | | | | | | | | 4.5 |

ANCHORING ENERGY: $1 \times 10^{-6}$ J/m²

FIG.6

| DARK-ROOM CONTRAST RATIO (@0 V/@7 V) | | S (μm) | | | | | | | | |
|---|---|---|---|---|---|---|---|---|---|---|
| | | 0.5 | 0.6 | 0.8 | 0.9 | 1.0 | 1.1 | 1.4 | 1.5 | 3.0 |
| L (μm) | 0.3 | | 450 | | | 214 | | 139 | | |
| | 0.4 | | | | | 1061 | | 531 | | |
| | 0.5 | | | 1101 | 931 | 1030 | | | | |
| | 0.6 | | 142 | | | 1027 | | | | |
| | 0.7 | | 96 | | | 353 | | 438 | | |
| | 1.0 | 4.8 | | | | 157 | | | | |
| | 2.5 | | | | | | | | | 5.1 |

ANCHORING ENERGY: $1 \times 10^{-7}$ J/m$^2$

FIG.7

| L/S | | S (μm) | | | | | | | | |
|---|---|---|---|---|---|---|---|---|---|---|
| | | 0.5 | 0.6 | 0.8 | 0.9 | 1.0 | 1.1 | 1.4 | 1.5 | 3.0 |
| L (μm) | 0.3 | | 0.5 | | | 0.3 | | 0.21 | | |
| | 0.4 | | | | | 0.4 | | 0.29 | | |
| | 0.5 | | | 0.63 | 0.56 | 0.5 | | | | |
| | 0.6 | | 1 | | | 0.6 | | | | |
| | 0.7 | | 1.17 | | | 0.7 | | 0.5 | | |
| | 1.0 | 2.0 | | | | 1.0 | | | | |
| | 2.5 | | | | | | | | | 0.83 |

LIQUID CRYSTAL DISPLAY PANEL

BACKGROUND

1. Technical Field

The present invention relates to a liquid crystal display panel, and more particularly, to a liquid crystal display panel that performs displaying in the normally white mode.

2. Description of the Related Art

Liquid crystal display panels operating in lateral electric field modes, such as the in-plane switching (IPS) mode or the fringe field switching (FFS) mode, have an advantage that the viewing angle dependence of γ characteristics is small compared to conventional liquid crystal display panels operating in vertical electric field modes (e.g., the vertical alignment (VA) mode or the twisted nematic (TN) mode). Therefore, liquid crystal display panels operating in lateral electric field modes are widely used as, for example, small- and medium-sized liquid crystal display panels.

Meanwhile, as the definition of liquid crystal display panels has become higher, the pixel aperture ratio (the ratio of the total area of pixel aperatures to a display region) has become smaller, and therefore, it has become more difficult to obtain sufficient display luminance. For example, the contrast ratio may be insufficient.

The FFS mode liquid crystal display panels that are currently on the market perform displaying in the normally black mode. Normally black mode liquid crystal display panels tend to have a low mode efficiency due to their operating principle, compared to normally white mode (e.g., TN mode) liquid crystal display panels. The lower the mode efficiency is, the lower the display luminance is.

Japanese Patent Laid-Open Publication No. 9-80383, Japanese Patent No. 2940354, and Japanese Patent Laid-Open Publication No. 11-72785 each disclose a liquid crystal display panel that performs displaying in the normally white mode by applying a lateral electric field to a crystal layer that is in a twisted alignment state in the absence of an applied voltage.

SUMMARY there is room for improvement of the contrast ratios of the liquid crystal display panels disclosed in Japanese Patent Laid-Open Publication No. 9-80383, Japanese Patent No. 2940354, and Japanese Patent Laid-Open Publication No. 11-72785. For example, Japanese Patent Laid-Open Publication No. 9-80383 discloses liquid crystal display panels of examples 37 and 38 that have a contrast ratio of 35 and 150, respectively.

It is an object of the present invention to improve the contrast ratio of a liquid crystal display panel that performs displaying in a normally white mode by applying a lateral electric field to a liquid crystal layer that is in a twisted alignment state in the absence of an applied voltage.

An embodiment of the present invention provides means for achieving the above object as follows.

[Aspect 1]

A liquid crystal display panel for performing displaying in a normally white mode, comprising:

a liquid crystal cell having a first substrate, a second substrate, and a liquid crystal layer provided between the first and second substrates;

a first polarizer disposed on a back side of the liquid crystal cell; and a second polarizer disposed on a viewer side of the liquid crystal cell, wherein the first and second polarizers are disposed so that transmission axes thereof are perpendicular to each other, the liquid crystal layer is in a twisted alignment state in the absence of an applied voltage, the first substrate has a first electrode having a plurality of rectangular openings extending in parallel to each other, a second electrode facing the first electrode with a dielectric layer interposed therebetween, and a first horizontal alignment film provided between the first and second electrodes and the liquid crystal layer, the second substrate has a second horizontal alignment film facing the first horizontal alignment film with the liquid crystal layer interposed therebetween, the plurality of rectangular openings each independently have a width S of more than 0.6 μm and not more than 1.4 μm, and each pair of adjacent ones of the plurality of rectangular openings independently has a distance L therebetween of not less than 0.3 μm and not more than 0.7 μm, and the first and second horizontal alignment films each have an azimuthal anchoring energy of not more than $1 \times 10^{-4}$ J/m².

[Aspect 2]

A liquid crystal display panel for performing displaying in a normally white mode, comprising:

a liquid crystal cell having a first substrate, a second substrate, and a liquid crystal layer provided between the first and second substrates;

a first polarizer disposed on a back side of the liquid crystal cell; and a second polarizer disposed on a viewer side of the liquid crystal cell, wherein the first and second polarizers are disposed so that transmission axes thereof are perpendicular to each other, the liquid crystal layer is in a twisted alignment state in the absence of an applied voltage, the first substrate has a first electrode having a plurality of rectangular openings extending in parallel to each other, a second electrode facing the first electrode with a dielectric layer interposed therebetween, and a first horizontal alignment film provided between the first and second electrodes and the liquid crystal layer, and the second substrate has a third electrode facing the first and/or second electrodes, and a second horizontal alignment film provided between the third electrode and the liquid crystal layer, and facing the first horizontal alignment film with the liquid crystal layer interposed therebetween.

[Aspect 3]

The liquid crystal display panel of aspect 1 or 2, wherein the plurality of rectangular openings each independently have a width S of not less than 0.8 μm and not more than 1.0 μm, and each pair of adjacent ones of the plurality of rectangular openings independently has a distance L therebetween of not less than 0.4 μm and not more than 0.6 μm.

[Aspect 4]
The liquid crystal display panel of any of aspects 1 to 3, wherein
the liquid crystal layer has a twist angle of not less than 85° and not more than 90° in the absence of an applied voltage.
The liquid crystal layer may have a twist angle of less than 90° in the absence of an applied voltage.
[Aspect 5]
The liquid crystal display panel of any of aspects 1 to 4, wherein
an angle between an alignment azimuth determined by the second horizontal alignment film and the transmission axis of the first or second polarizer is not less than 89.7° and not more than 90.3°.
[Aspect 6]
The liquid crystal display panel of any of aspects 1 to 5, wherein
a pretilt angle determined by the first horizontal alignment film and a pretilt angle determined by the second horizontal alignment film are each 0°.
[Aspect 7]
The liquid crystal display panel of any of aspects 1 to 6, wherein
the first and second horizontal alignment films are each a photoalignment film.
[Aspect 8]
The liquid crystal display panel of any of aspects 1 to 7, wherein
the liquid crystal layer contains a nematic liquid crystal material having a positive dielectric anisotropy $\Delta\varepsilon$.
[Aspect 9]
The liquid crystal display panel of any of aspects 1 to 8, wherein
the liquid crystal layer contains a nematic liquid crystal material having a dielectric anisotropy $\Delta\varepsilon$ of not less than 12.
[Aspect 10]
The liquid crystal display panel of any of aspects 1 to 9, wherein
the first and second horizontal alignment films each have a polar anchoring energy of not more than $1 \times 10^{-4}$ J/m².
The polar anchoring energy of the first horizontal alignment film may be greater than the azimuthal anchoring energy of the first horizontal alignment film. The polar anchoring energy of the second horizontal alignment film may be greater than the azimuthal anchoring energy of the second horizontal alignment film.
[Aspect 11] The liquid crystal display panel of any of aspects 1 to 10, wherein
the first electrode is located closer to the liquid crystal layer than is the second electrode.
[Aspect 12]
The liquid crystal display panel of any of aspects 1 to 11, wherein
$\Delta n \times d$ is not less than 420 nm and not more than 480 nm where $\Delta n$ represents a birefringence of a nematic liquid crystal contained in the liquid crystal layer, and d indicates a thickness of the liquid crystal layer.
[Aspect 13]
The liquid crystal display panel of any of aspects 1 to 12, wherein
the liquid crystal layer has a thickness of not less than 3.5 µm and not more than 4.0 µm.
[Aspect 14]
The liquid crystal display panel of any of aspects 1 to 13, wherein
L/S is not less than 0.4 and not more than 0.63.

[Aspect 15]
The liquid crystal display panel of any of aspects 1 to 14, wherein
the ratio of a luminance of the liquid crystal display panel occurring in the absence of an applied voltage, and a luminance of the liquid crystal display panel occurring in the presence of a voltage of 7 V applied between the first and second electrodes, as viewed at a front viewing angle in a dark room, is not less than 400.
[Aspect 16]
The liquid crystal display panel of any of aspects 1 to 15, wherein
the ratio of a luminance of the liquid crystal display panel occurring in the absence of an applied voltage, and a luminance of the crystal display panel occurring in the presence of a voltage of 7 V applied between the first and second electrodes, as viewed at a front viewing angle in a dark room, is not less than 900.

According to an embodiment of the present invention, the contrast ratio of a liquid crystal display panel that performs displaying in a normally white mode by applying a lateral electric field to a liquid crystal layer which is in a twisted alignment state in the absence of an applied voltage.

BRIEF DESCRIPTION OF THE DRAWINGS

FIG. 3 is a diagram showing dark-room contrast ratios of liquid crystal display panels in which a first and a second horizontal alignment film each had an azimuthal anchoring energy of $1 \times 10^3$ J/m².

FIG. 4 is a diagram showing dark-room contrast ratios of liquid crystal display panels in which a first and a second horizontal alignment film each had an azimuthal anchoring energy of $1 \times 10^{-4}$ J/m².

FIG. 5 is a diagram showing dark-room contrast ratios of liquid crystal di play panels in which a first and a second horizontal alignment film each had an azimuthal anchoring energy of $1 \times 10^{-6}$ J/m².

FIG. 6 is a diagram showing dark-room contrast ratios of liquid crystal display panels in which a first and a second horizontal alignment film each had an azimuthal anchoring energy of $1 \times 10^{-7}$ J/m².

FIG. 7 is a diagram showing the value of L/S of the slit structure of a pixel electrode.

DETAILED DESCRIPTION

The structure of a liquid crystal display panel according to an embodiment of the present invention will now be described with reference to the accompanying drawings. Note that elements of Lake functions may be denoted by like reference signs and may not be described redundantly.

The structure of a liquid crystal display panel 100A according to an embodiment of the present invention will be described with reference to FIGS. 1A-1C.

Figure 1A:
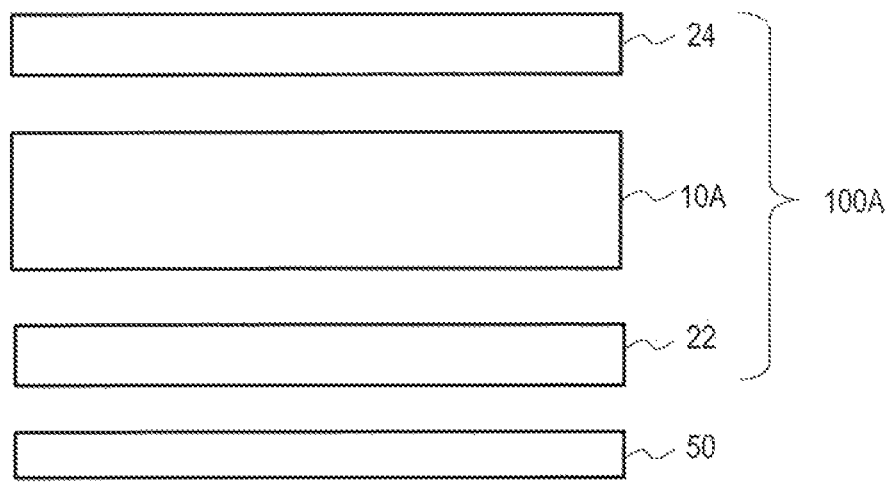
FIG. 1A is a schematic exploded cross-sectional view of a liquid crystal display panel 100A according to an embodiment of the present invention, additionally showing a backlight 50.

FIG. 1A is a schematic exploded cross-sectional view of the liquid crystal display panel 100A according to an embodiment of the present invention, additionally showing a backlight 50. A liquid crystal display device according to an embodiment of the present invention is a transmissive mode liquid crystal display device that includes the liquid crystal display panel 100A and the backlight 50. FIG. 1B is a schematic cross-sectional view of a portion corresponding to one pixel of a liquid crystal cell 10A included in the liquid crystal display panel 100A. FIG. 1C is a schematic plan view of a portion corresponding to one pixel of the liquid crystal cell 10A.

As shown in FIG. 1A, the liquid crystal display panel 100A has: a liquid crystal cell 10A having a first substrate (back-side substrate (e.g., a TFT substrate) disposed closer to the backlight) 10Sa, a second substrate (viewer-side substrate (e.g., a color filter substrate)) 10Sb, and a liquid crystal layer 18 provided between the first substrate 10Sa and the second substrate 10Sb; a first polarizer 22 disposed on the back side (opposite side or surface from the viewer) of the liquid crystal cell 10A; and a second polarizer 24 disposed on the viewer side (side or surface closer to the viewer) of the liquid crystal cell 10A.

The liquid crystal display panel 100A performs displaying in the normally white mode.

The first polarizer 22 and the second polarizer 24 are disposed so that the transmission axes (polarization axes) thereof are perpendicular to each other. In other words, the first polarizer 22 and the second polarizer 24 are arranged in crossed Nicols.

The liquid crystal layer 18 is in a twisted alignment state in the absence of an applied voltage.

The first substrate 10Sa has: a first electrode 16 having a plurality of rectangular openings 16a extending in parallel to each other; a second electrode 14 facing the first electrode 16 with a dielectric layer 15 interposed therebetween; and a first horizontal alignment film 17a provided between the first and second electrodes 16 and 14 and the liquid crystal layer 18.

The second substrate 10Sb has a second horizontal alignment film 17b facing the first horizontal alignment film 17a with the liquid crystal layer 18 interposed therebetween.

The plurality of rectangular openings 16a each independently has a width S of more than 0.6 μm and not more than 1.4 μm. Each pair of adjacent ones of the plurality of rectangular openings 16a independently has a distance L therebetween of not less than 0.3 μm and not more than 0.7 μm.

The first horizontal alignment film 17a and the second horizontal alignment film 17b each have an azimuthal anchoring energy of not more than $1 \times 10^{-4}$ J/m².

The liquid crystal display panel 100A can have a high dark-room contrast ratio. The result of a simulation of changes in dark room contrast ratio by changing the structure of the openings 16a of the pixel electrode 16 or the anchoring energies of the first horizontal alignment film 17a and the second horizontal alignment film 17b will be described below.

Figure 1B:
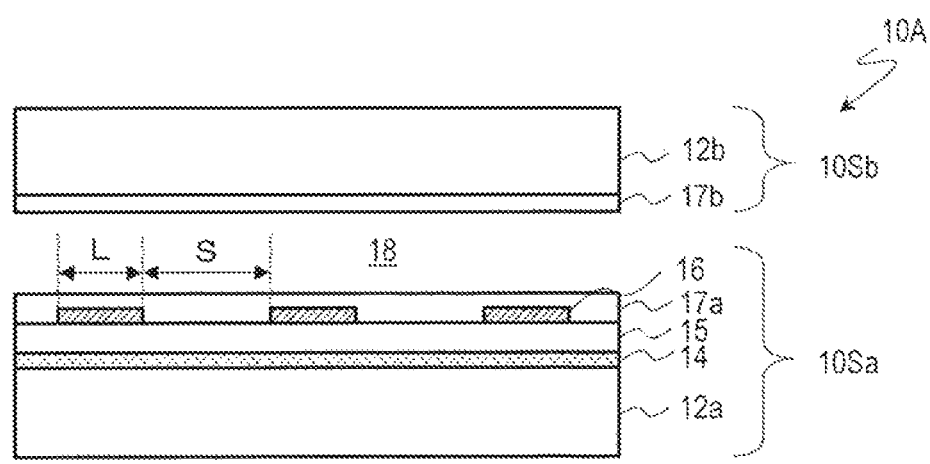
FIG. 1B is a schematic cross-sectional view of a portion corresponding to one pixel of a liquid crystal cell 10A included in the liquid crystal display panel 100A.
Figure 1C:
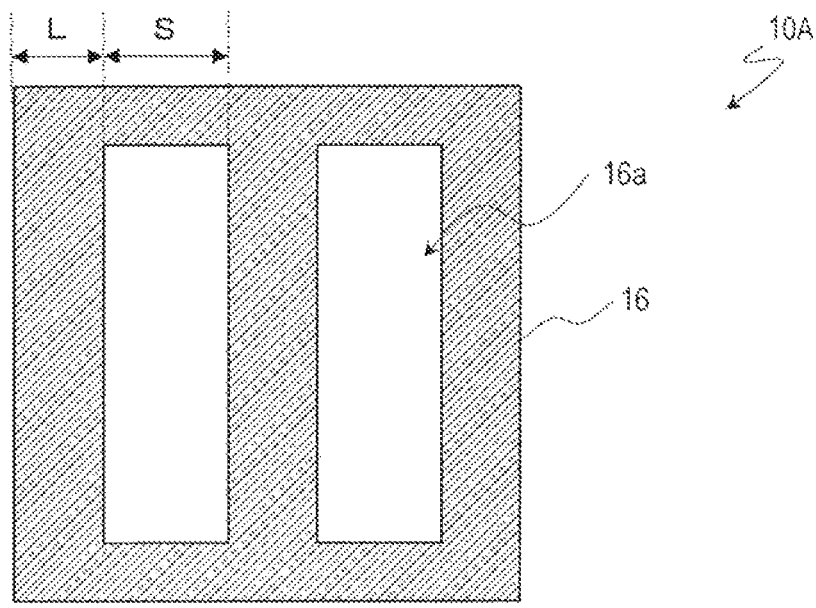
FIG. 1C is a schematic plan view of a portion corresponding to one pixel of the liquid crystal cell 10A.

As shown in FIG. 1B, the liquid crystal cell 10A has the first substrate 10Sa, the second substrate 10Sb, and the liquid crystal layer 18 provided between the first substrate 10Sa and the second substrate 10Sb. The first substrate 10Sa has a transparent substrate 12a, a common electrode 14 formed on the transparent substrate 12a, the dielectric layer 15 formed on the common electrode 14, and the pixel electrode 16 formed on the dielectric layer 15. A protective film is optionally formed on a side of the pixel electrode 16 closer to the liquid crystal layer 18. The first substrate 10Sa and the second substrate 10Sb have the first horizontal alignment film 17a and the second horizontal alignment film 17b, respectively, on respective surfaces thereof closer to the liquid crystal layer 18. The first substrate 10Sa may also have a thin-film transistor (hereinafter referred to as a "TFT") for supplying a display signal voltage to the pixel electrode 16, and a gate bus line and a source bus line for supplying the signal voltage to the TFT (none of them is shown). The first substrate 10Sa has a pair of electrodes for generating a lateral electric field in the liquid crystal layer 18. Here, the common electrode 14 and the pixel electrode 16 form the electrode pair. Here, the pixel electrode 16 is located closer to the liquid crystal layer 18 than is the common electrode 14. As shown in FIG. 1C, the pixel electrode 16 has a plurality of rectangular openings 16a extending in parallel to each other. The second substrate 10Sb has a transparent substrate 12b. For example, a color filter layer (not shown) and an alignment film may be formed on a side of the transparent substrate 12b closer to the liquid crystal layer 18. The liquid crystal display panel according to an embodiment of the present invention is not limited to the above illustrated configuration, and is widely applicable to, for example, known FFS mode liquid crystal display panels.

The first horizontal alignment film 17a and the second horizontal alignment film 17b each determine the alignment direction of liquid crystal molecules contained in the liquid crystal layer 18.

As used herein, the term "alignment direction" refers to the alignment direction of liquid crystal molecules in the absence of an applied electric field. The alignment direction of liquid crystal molecules that occurs when a voltage is not applied across a liquid crystal layer is represented by an "alignment azimuth (pretilt azimuth)" and a "pretilt angle." Specifically, the first horizontal alignment film 17a and the second horizontal alignment film 17b each determine the alignment azimuths and pretilt angles of liquid crystal molecules included in the liquid crystal layer 18. The alignment azimuth refers to a component in the plane of a liquid crystal layer tin the plane of a substrate) of a vector indicating the alignment direction of liquid crystal molecules in the liquid crystal layer in the absence of an applied voltage. The pretilt angle refers to an angle between the major axis of a liquid crystal molecule and the plane of the substrate. Note that, as used herein, these definitions are applied to the case where the pretilt angle is 0°. This embodiment includes the case where the pretilt angle is 0°.

The twist direction of the liquid crystal layer 18 refers to how the major axes of liquid crystal molecules are twisted from the back-side substrate 10Sa (also hereinafter referred to as a "lower substrate") toward the viewer-side substrate 10Sb (also hereinafter referred to as an "upper substrate"), as viewed from the viewer side. In the description that follows, the case where the liquid crystal layer 18 has a counterclockwise twist direction will be described. Alternatively, the present invention is also applicable to the case where the liquid crystal layer 18 has a clockwise twist direction.

Directions (azimuths) such as the alignment direction of liquid crystal molecules, and a polarization direction, are hereinafter represented by an azimuth angle as measured with reference to the azimuth of a lateral electric field. Counterclockwise rotations as viewed by the viewer represent positive rotations, where the azimuth of a lateral electric field (the three o' clock direction of a clock face) is 0°. Twisted alignment is determined by the alignment azimuths of the major axes of liquid crystal molecules near the lower substrate (first substrate 10Sa) and the alignment azimuths of the major axes of liquid crystal molecules near the upper substrate (second substrate 10Sb). The alignment azimuths of the major axes of liquid crystal molecules near the lower substrate (first substrate 10Sa) are determined by the first horizontal alignment film 17a, and the alignment azimuths of the major axes of liquid crystal molecules near the upper substrate (second substrate 10Sb) are determined by the second horizontal alignment film 17b.

The first polarizer 22 and the second polarizer 24 are both a linear polarizer. The liquid crystal display panel 100A may, for example, further have a compensation layer (retardation layer) for compensating for the wavelength dispersion of the refractive index of the liquid crystal layer 18, between the liquid crystal cell 10A and the first polarizer 22 provided on a side of the liquid crystal cell 10A closer to the backlight 50, and/or between the liquid crystal cell 10A and the second polarizer 24 provided on a side of the liquid crystal cell 10A closer to the viewer.

Here, an example will be described in which the liquid crystal layer 18 contains a nematic liquid crystal material having a positive dielectric anisotropy Δε. Although the liquid crystal layer may contain a nematic liquid crystal material having a negative dielectric anisotropy Δε, the liquid crystal layer is preferably formed of a nematic liquid crystal material having a positive dielectric anisotropy Δε in terms of reliability.

The behavior of liquid crystal molecules that occurs when a voltage is applied across the liquid crystal layer will be described with reference to FIGS. 2A-2C.

Figure 2A:
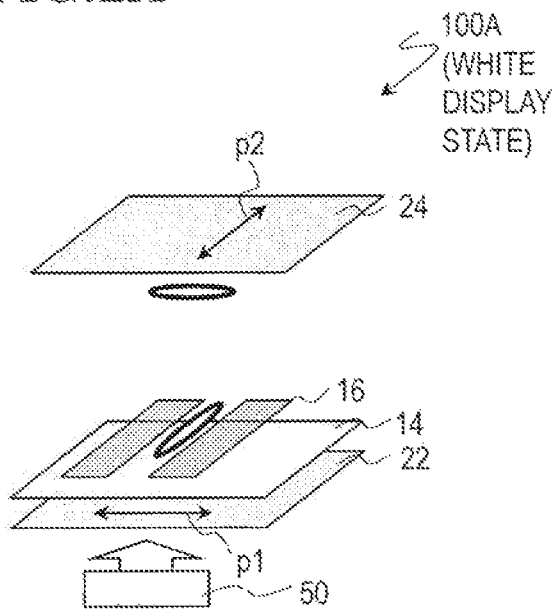
FIG. 2A is a schematic perspective view of the liquid crystal display panel 100A in the case where a voltage is not applied (white display state).
Figure 2B:
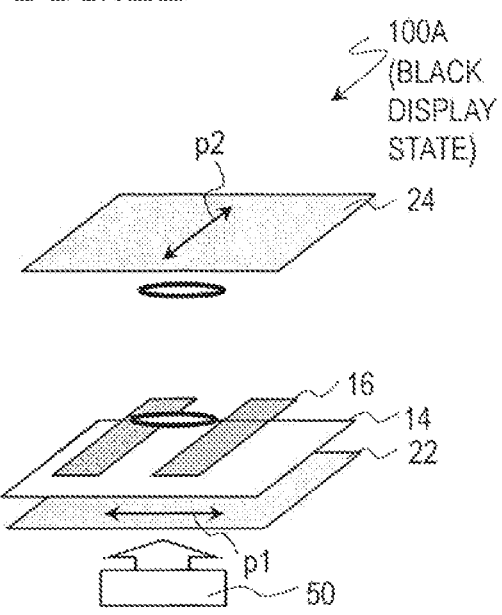
FIG. 2B is a schematic perspective view of the liquid crystal display panel 100A in the case where a voltage is applied across a liquid crystal layer (black display state).

FIGS. 2A and 2B are schematic perspective views of the liquid crystal display panel 100A. FIG. 2A shows the case where a voltage is not applied (white display state), and FIG. 2B shows the case where a voltage is applied across the liquid crystal layer (black display state). FIG. 2C is a diagram schematically showing how the alignment azimuth of a liquid crystal molecule is changed when a lateral electric field is generated in the liquid crystal layer, and is a schematic plan view of the first substrate 10Sa (lower substrate) as viewed from the direction of the viewer. FIGS. 2A and 2B show only a liquid crystal molecule near the first substrate 10Sa (lower substrate) and a liquid crystal molecule near the second substrate 10Sb (upper substrate).

As shown in FIG. 2A, the liquid crystal layer is in a twisted alignment state in the absence of an applied voltage. The twist angle of the liquid crystal layer in the absence of an applied voltage is, for example, approximately 90°. The alignment azimuth determined by the first horizontal alignment film 17a and the alignment azimuth determined by the second horizontal alignment film 17b are approximately perpendicular to each other. The twist angle of the liquid crystal layer in the absence of an applied voltage may be, for example, not less than 85° and not more than 90°. In that case, the angle between the alignment azimuth determined by the first horizontal alignment film 17a and the alignment azimuth determined by the second horizontal alignment film 17b is, for example, not less than 85° and not more than 90°. The twist angle of the liquid crystal layer in the absence of an applied voltage may be less than 90°. In that case, the twist direction of the liquid crystal layer 18 can be uniquely determined.

In the illustrated example, the azimuth angle of the transmission axis p1 of the first polarizer 22 is approximately perpendicular to the alignment azimuth determined by he first horizontal alignment, film 17a, and the azimuth angle of the transmission axis p2 of the second polarizer 24 is approximately perpendicular to the alignment azimuth determined by he second horizontal alignment film 17b. Namely, the azimuth angle of the transmission axis p1 of the first polarizer 22 is approximately perpendicular to the alignment azimuth of the liquid crystal molecule near the first substrate 10Sa (lower substrate), and the azimuth angle of the transmission axis p2 of the second polarizer 24 is approximately perpendicular to the alignment azimuth of the liquid crystal molecule near the second substrate 10Sb (upper substrate). The azimuth angle of the transmission axis p1 of the first polarizer 22 and the azimuth angle of the transmission axis p2 of the second polarizer 24 are not limited to the illustrated example, and may be reverse with respect to the illustrated azimuth angles.

Figure 2C:
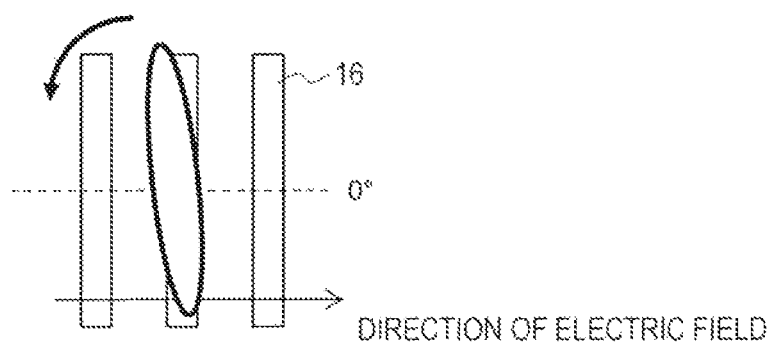
FIG. 2C is a diagram schematically showing how the alignment azimuth of a liquid crystal molecule is changed when a lateral electric field is generated in the liquid crystal layer.

As shown in FIGS. 2B and 2C, when an electric field is applied between the common electrode 14 and the pixel electrode 16 to generate a lateral electric field in the crystal layer 18, a force is exerted on the liquid crystal molecule near the first substrate 10Sa (lower substrate) so that the liquid crystal molecule is rotated counterclockwise. In the absence of an applied voltage, as shown in FIG. 2C, the director of the liquid crystal molecule near the first substrate 10Sa (lower substrate) is aligned so as to constitute an angle of approximately 90° (preferably more than 90° or less than 90°, e.g., 91°=−89° with respect to the direction of a lateral electric field (azimuth angle: 0°). When a lateral electric field is applied, the director of the nematic liquid crystal having a positive dielectric anisotropy is aligned so as to be parallel to the direction of the electric field, i.e., is rotated counterclockwise as indicated by the arrow. Meanwhile, the alignment azimuth of the liquid crystal molecule near the second substrate 10Sb (upper substrate) is not substantially changed by the lateral electric field generated in the liquid crystal layer 18. As a result, the twist angle of the liquid crystal layer is reduced, resulting in a state close to a homogeneous alignment state. In order to reduce the transmittance in the black display state, the angle between the alignment azimuth determined by the second horizontal alignment film 17b and the transmission axis p2 of the second polarizer 24 (or the transmission axis p1 of the first polarizer 22) is preferably not less than 89° and not more than 91°, more preferably not less than 89.7° and not more than 90.3°.

The first horizontal alignment film 17a and the second horizontal alignment film 17b may each independently be, for example, an alignment film prepared by a photoalignment treatment (photoalignment film) or an alignment film prepared by a rubbing treatment. The pretilt angles determined by the first horizontal alignment film 17a and the second horizontal alignment film 17b are each preferably 0°. Note that the present invention is not limited to this, and the pretilt angles determined by the first horizontal alignment film 17a and the second horizontal alignment film 17b may each be more than 0°.

The alignment film prepared by a rubbing treatment typically has an azimuthal anchoring energy of the order of $10^{-3}$ J/m$^2$. The photoalignment film is prepared by utilizing a reaction that is caused by irradiating a photoreactive compound with light, such as photoisomerization, photodimerization, or photodecomposition. An example of the photodecomposition-type alignment film has an azimuthal anchoring energy of the order of $10^{-3}$ J/m$^2$ (light absorption wavelength: 254 nm). An example of the photoisomerization-type alignment film has an azimuthal anchoring energy of the order of $10^{-4}$ J/m$^2$ (light absorption wavelength: 365 nm). An example of the photodimerization-type alignment film has an azimuthal anchoring energy of the order of $10^{-6}$ J/m$^2$ (light absorption wavelength: 313 nm).

The anchoring energy of an alignment film can be measured using a known technique. A method for measuring the anchoring energy of an alignment film is disclosed in, for example, Japanese Patent Laid-Open Publication Nos. 2003-57147 and 2007-248958, the entire contents of which are hereby incorporated by reference, particularly concerning a method for measuring the anchoring energy of an alignment film.

A relationship between the dark-room contrast ratio of the liquid crystal display panel 100A of this embodiment, and the slit structure of the opening 16a of the pixel electrode 16 and/or the anchoring energy of an alignment film, was investigated by a simulation. The configuration of the liquid crystal cell 10A used in the simulation is as follows.

The dielectric layer 15 was a silicon nitride ($Si_xN_y$) layer having thickness of 300 nm. The common electrode 14 and the pixel electrode 16 were each formed of an ITO layer having a thickness of 100 nm.

The liquid crystal layer 18 had a thickness (also called a "cell thickness") d of 3.9 µm. The liquid crystal layer 18 was formed of a nematic liquid crystal material having the following properties:

dielectric anisotropy $\Delta\varepsilon$=17.8 ($\varepsilon_{//}$=22.1 and $\varepsilon_\perp$=4.3);

birefringence $\Delta n$=0.12 ($n_e$=1.62 and $n_o$=1.5) with respect to light having a wavelength $\lambda$=550 nm;

viscosity $\rho$=0.071 Pa·s; and elastic constant $K_{11}$=10.7 pN, $K_{22}$=5.913 pN, and $K_{33}$=11.2 pN.

In order to increase the luminance in the absence of an applied voltage (i.e., in the white display state), the liquid crystal layer 18 preferably satisfies the following conditional expression (1).

$$\Delta n \times d/\lambda = (\sqrt{3})/2 \quad (1)$$

Expression (1) is known as the first minimum condition that is derived from the Gooch-Tarry equation based on Mauguin's approximation. According to the Gooch-Tarry equation, the luminance in the absence of an applied voltage increases with a decrease in deviation from expression (1). For example, expression (1) is satisfied in the case where $\Delta n \times d$ is 475 nm with respect to light having a wavelength $\lambda$ of 550 nm. The liquid crystal layer 18 preferably has a $\Delta n \times d$ of, for example, not less than 420 nm and not more than 480 nm. The liquid crystal layer 18 preferably has a thickness d of, for example, not less than 3.5 µm and not more than 4.0 µm.

The alignment azimuth determined by the first horizontal alignment film 17a was −90°, and the alignment azimuth determined by the second horizontal alignment film 17b was 0°. The pretilt angles determined by the first horizontal alignment film 17a and the second horizontal alignment film 17b were each 0°. The azimuth angle of the transmission axis of the first polarizer 22 was 0°, and the azimuth angle of the transmission axis of the second polarizer 24 was 90°. The simulation was conducted using LCDMaster 2-D (manufactured by Shintech Inc.).

Initially, how the dark-room contrast ratio is changed, depending on the slit structure of the pixel electrode 16 (i.e., the width S of the opening 16a, the distance L between each opening 16a, and the distance L between an opening 16a and an edge of the pixel electrode 16) was investigated. As the dark-room contrast ratio, the ratio of the luminance in the white display state (in the absence of an applied voltage) and the luminance in the black display state (a voltage of 7 V was added between the common electrode 14 and the pixel electrode 16), as viewed at a front viewing angle in a dark room, was calculated. The same applies to the description that follows unless otherwise specified.

FIG. 3 shows dark-room contrast ratios as a result of the case where the first horizontal alignment film 17a and the second horizontal alignment film 17b each had an azimuthal anchoring energy of $1\times10^3$ J/m$^2$. The first horizontal alignment film 17a and the horizontal alignment film 17b also each had a polar anchoring energy of $1\times10^3$ J/m$^2$.

As shown in FIG. 3, it was found that the contrast ratio changes significantly, depending on the values of L and S of the slit structure of the pixel electrode 16. In the case where (L, S)=(0.5 µm, 1.0 µm) (also referred to as a "liquid crystal display panel of Comparative Example 1"), the highest contrast ratio (253) was obtained. Note that this value is not sufficient. The contrast ratio is preferably, for example, not less than 400, more preferably not less than 900. In the simulation, the contrast ratio obtained in the case where (L, S)=(2.5 µm, 3.0 µm) (also referred to as a "liquid crystal display and of Comparative Example 2") was the lowest (4).

Note that the mode efficiencies of the liquid crystal display panels of Comparative Examples 1 and 2 are shown in Table 3. Table 3 shows the structure (the structure of the pixel electrode 16, and the anchoring energy of an alignment film), display mode, dark-room contrast ratio, and mode efficiency of each of the liquid crystal display panels of Examples 1-3 and Comparative Examples 1-4.

The mode efficiency is defined as follows. Note that the mode efficiency as viewed at a front viewing angle is herein calculated.

Mode efficiency (%)=((the light transmittance of a liquid crystal display panel)/(the light transmittance as measured when only a pair of polarizers are arranged in crossed Nicols))×100

Note that the "light transmittance of a liquid crystal display panel" in the above expression is normalized using the aperture ratio. In addition, "×" represents multiplication. The aperture ratio represents the ratio of an area that contributes to actual displaying to the area of the display region of a liquid crystal display panel. The mode efficiency of a liquid crystal display panel that performs displaying in the normally white mode corresponds to the transmittance in the white display state. The luminance in the white display state increases with an increase in mode efficiency.

FIG. 4 shows contrast ratios as a result of the case where the first horizontal alignment film 17a and the second horizontal alignment film 17b each had an azimuthal anchoring energy of $1 \times 10^{-4}$ J/m$^2$. The first horizontal alignment film 17a and the second horizontal alignment film 17b also each had a polar anchoring energy of $1 \times 10^{-4}$ J/m$^2$.

As shown in FIG. 4, it was found that the contrast ratio changes significantly, depending on the values of L and S of the slit structure of the pixel electrode 16. The comparison of FIG. 3 with FIG. 4 indicates that the contrast ratio also changes significantly, depending on the anchoring energy of an alignment film. In FIG. 4, the anchoring energy ($1 \times 10^{-4}$ J/m$^2$) is smaller than that of FIG. 3 (anchoring energy: $1 \times 10^{3}$ J/m$^2$), and the contrast ratio is higher than that of FIG. 3. In particular, the highest contrast ratio (986) was obtained in the case where (L, S)=(0.5 μm, 1.0 μm) (also referred to as a "liquid crystal display panel of Example 1"). In FIG. 4, the regions where the contrast ratio is not less than 400 are shown in gray. As can be seen from FIG. 4, it can here be said that if L is not less than 0.4 μm and not more than 0.6 μm and S is not less than 0.8 μm and not more than 1.0 μm, a contrast ratio of not less than 400 is obtained. It can also be said that if (L, S)=(0.5 μm, 1.0 μm), a contrast ratio of not less than 900 is obtained.

As shown in FIG. 4, in the simulation, the contrast ratio obtained in the case where (L, S)=(2.5 μm, 3.0 μm) (also referred to as a "liquid crystal display panel of Comparative Example 3") was the lowest (4.2).

The mode efficiencies of the liquid crystal display panels of Example 1 and Comparative Example 3 are shown in Table 3.

FIG. 5 shows contrast ratios as a result of the case where the first horizontal alignment film 17a and the second horizontal alignment film 17b each had an azimuthal anchoring energy of $1 \times 10^{-6}$ J/m$^2$. The first horizontal alignment film 17a and the second horizontal alignment film 17b also each had a polar anchoring energy of $1 \times 10^{-6}$ J/m$^2$.

As shown in FIG. 5, the anchoring energy ($1 \times 10^{-6}$ J/m$^2$) is smaller than that of FIG. 4 (anchoring energy: $1 \times 10^{-4}$ J/m$^2$), and the contrast ratio is higher than that of FIG. 4. In particular, the highest contrast ratio (1008) was obtained in the case where (L, S)=(0.5 μm, 1.0 μm) (also referred to as a "liquid crystal display panel of Example 2"). Also in FIG. 5, the regions where the contrast ratio is not less than 400 are shown in gray. As can be seen from FIG. 5, it can here be said that if L is not less than 0.4 μm and not more than 0.6 μm and S is not less than 0.8 μm and not more than 1.1 μm, a contrast ratio of not less than 400 is obtained. It can also be said that if (L, S)=(0.5 μm, 1.0 μm), a contrast ratio of not less than 900 is obtained. The mode efficiency of the liquid crystal display panel of Example 2 is shown in Table 3.

FIG. 6 shows contrast ratios as a result of the case where the first horizontal alignment film 17a and the second horizontal alignment film 17b each had an azimuthal anchoring energy of $1 \times 10^{-7}$ J/m$^2$. The first horizontal alignment film 17a and the second horizontal alignment film 17b also each had a polar anchoring energy of $1 \times 10^{-7}$ J/m$^2$.

As shown in FIG. 6, the anchoring energy ($1 \times 10^{-7}$ J/m$^2$) is smaller than that of FIG. 5 (anchoring energy: $1 \times 10^{-6}$ J/m$^2$), and the contrast ratio is higher than that of FIG. 5. In particular, the highest contrast ratio (1030) was obtained in the case where (L, S)=(0.5 μm, 1.0 μm). Also in FIG. 6, the regions where the contrast ratio is not less than 400 are shown in array. As can be seen from FIG. 6, it can here be said that if L is not less than 0.3 μm and not more than 0.7 μm and S is not less than 0.6 μm and not more than 1.4 μm, a contrast ratio of not less than 400 is obtained. In particular, if L is not less than 0.4 μm and not more than 0.6 μm and S is not less than 0.8 μm and not more than 1.0 μm, a contrast ratio of not less than 900 is obtained.

FIG. 7 is a diagram showing the ratio (L/S) of L to S of the slit structure of the pixel electrode 16. FIG. 7 corresponds to FIG. 6, and shows the same regions as the gray regions of FIG. 6 in gray. FIG. 7 also shows the value of L/S only in the region where the value of the contrast ratio is obtained in FIG. 6.

As can be seen from FIG. 7, it can be said that in order to obtain a high contrast ratio, the value of L/S is preferably not less than 0.29 and not more than 0.63, more preferably not less than 0.4 and not more than 0.63.

Figure 8:
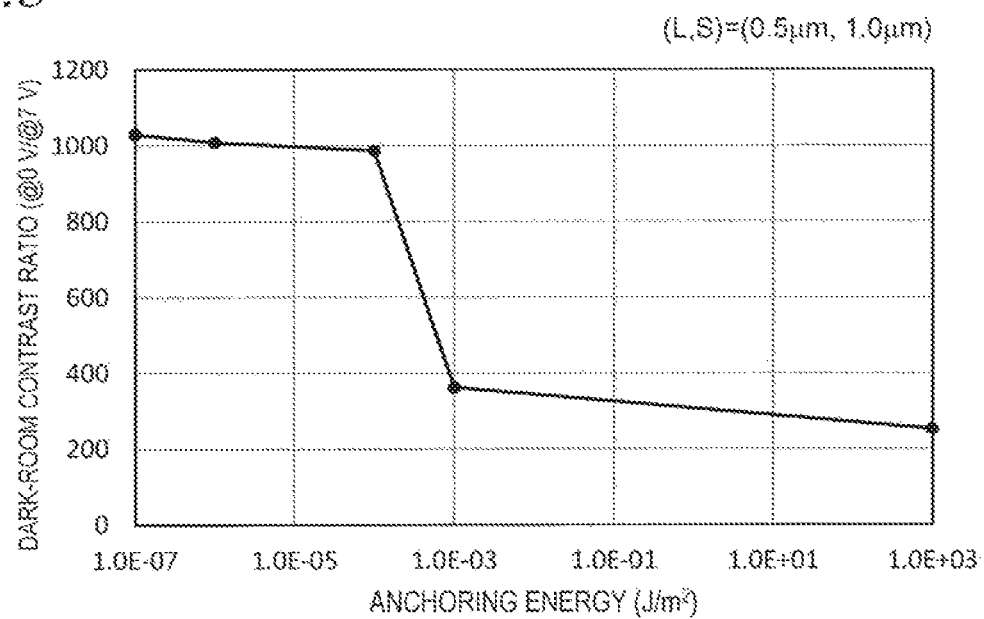
FIG. 8 is a diagram showing a relationship between the azimuthal anchoring energy of an alignment film, and a dark-room contrast ratio, in the case where the slit structure of a pixel electrode had (L, S)=(0.5 μm, 1.0 μm).

FIG. 8 and Table 1 show the results of calculating changes in dark-room contrast ratio caused by changing the azimuthal anchoring energy of an alignment film. Here, the slit structure had (L, S)=(0.5 μm, 1.0 μm). Note that FIG. 8 and Table 1 include the results of the liquid crystal display panels of Comparative Example 1, Example 1, and Example 2. Here, the first horizontal alignment film 17a and the second horizontal alignment film 17b had the same azimuthal anchoring energy. The first horizontal alignment film 17a and the second horizontal alignment film 17b also had the same polar anchoring energy, and that polar anchoring energy is equal to the azimuthal anchoring energy.

As shown in FIG. 8 and Table 1, a higher contrast ratio was obtained as the azimuthal anchoring energy of the alignment films was reduced.

TABLE 1

| | Anchoring energy [J/m$^2$] | | | | |
|---|---|---|---|---|---|
| | $1 \times 10^{3}$ | $1 \times 10^{-3}$ | $1 \times 10^{-4}$ | $1 \times 10^{-6}$ | $1 \times 10^{-7}$ |
| Dark-room contrast ratio (@0 V/@7 V) | 253 | 363 | 986 | 1008 | 1030 |

As can be seen from FIGS. 4-6 and 8, it can be said that if the first horizontal alignment film 17a and the second horizontal alignment film 17b each have an azimuthal anchoring energy of not more than $1 \times 10^{-4}$ J/m$^2$, and the slit structure of the pixel electrode 16 has an L of not less than 0.3 μm and not more than 0.7 μm and an S of more than 0.6 μm and not more than 1.4 μm, a contrast ratio of not less than 400 is obtained. It can also be said that if the first horizontal alignment film 17a and the second horizontal alignment film 17b each have an azimuthal anchoring energy of not more than $1\times10^{-4}$ J/m², and L is 0.5 μm and S is 1.0 μm, a contrast ratio of not less than 900 is obtained, which is more preferable. Alternatively, it can also be said that if the first horizontal alignment film 17a and the horizontal alignment film 17b each have an azimuthal anchoring energy of not more than $1\times10^{-7}$ J/m², and L is not less than 0.4 μm and not more than 0.6 μm and S is not less than 0.8 μm and not more than 1.0 μm, a contrast ratio of not less than 900 is obtained, which is more preferable.

The first horizontal alignment film 17a and the second horizontal alignment film 17b each have a polar anchoring energy of, for example, not more than $1\times10^{-4}$ J/m². The polar anchoring energy of the first horizontal alignment film 17a is preferably greater than the azimuthal anchoring energy of the first horizontal alignment film 17a, and the polar anchoring energy of the second horizontal alignment film 17b is preferably greater than the azimuthal anchoring energy of the second horizontal alignment film 17b. In a lateral electric field mode liquid crystal display panel, when a voltage is applied to the pair of electrodes for generating a lateral electric field in the liquid crystal layer, not only the lateral electric field (an electric field in the horizontal direction, i.e., an electric field parallel to the plane of the liquid crystal layer), but also a vertical electric field component (e.g., near the edges of the pair of electrodes), are generated in the liquid crystal layer. Liquid crystal molecules of nematic liquid crystal having a positive dielectric anisotropy are aligned with the major axes of the molecules parallel to an electric field. Therefore, in a region having a strong vertical electric field component, liquid crystal molecules are put into a vertical position. If the horizontal alignment film has a great polar anchoring energy, liquid crystal molecules can be substantially inhibited from being put into a vertical position. Note that the liquid crystal di pi panel according to an embodiment of the present invention is mainly operated by a lateral electric field generated in the liquid crystal layer, and therefore, it is considered that the influence of the polar anchoring energy is smaller than the influence of the azimuthal anchoring energy.

Figure 9:
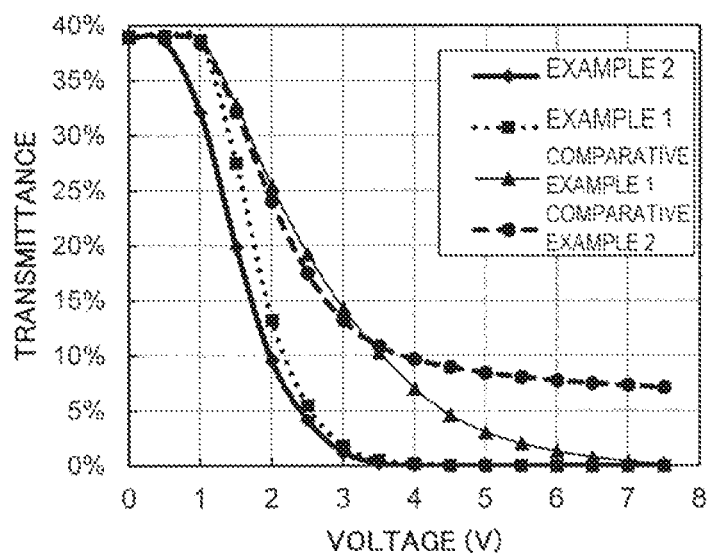
FIG. 9 is a diagram showing the transmittances of crystal display panels according to Comparative Examples 1 and 2 and Examples 1 and 2.

FIG. 9 shows the results of calculating the transmittances of the liquid crystal display panels of Comparative Examples 1 and 2 and Examples 1 and 2. In FIG. 9, the horizontal axis represents voltages applied between the common electrode 14 and the pixel electrode 16, and the vertical axis represents transmittances of the liquid crystal display panels.

As can be seen from FIG. 9, the transmittances in the black display state of the liquid crystal display panels of Examples 1 and 2 are lower than those of liquid crystal display panels of Comparative Examples 1 and 2. As a result, a better black di pi V state is obtained, and a higher contrast ratio is obtained.

The transmittance of an FFS mode liquid crystal display panel that performs displaying in the normally black mode, which is a liquid crystal display panel according to Comparative Example 4, was calculated.

Figure 10:
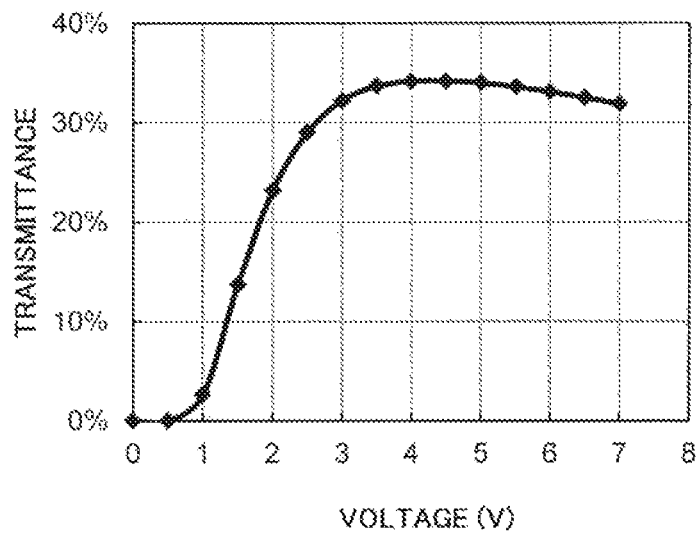
FIG. 10 is a diagram showing the transmittance of a liquid crystal display panel according to Comparative Example 4.

FIG. 10 shows the results of calculating the transmittance of the liquid crystal display panel of Comparative Example 4. In FIG. 10, the horizontal axis represents voltages applied between the common electrode 14 and the pixel electrode 16, and the vertical axis represents transmittances of the liquid crystal display panel.

The liquid crystal display panel of Comparative Example 4 is different from the liquid crystal display panel of Comparative Example 2 in that the liquid crystal layer is in a homogeneous alignment state in the absence of an applied voltage. The alignment azimuth determined by the first horizontal alignment film 17a and the alignment azimuth determined by he second horizontal alignment film 17b were both 0°. The azimuth angle of the transmission axis of the first polarizer 22 was 0°, and the azimuth angle of the transmission axis of the second polarizer 24 was 90°.

Table shows the dark-room contrast ratio and mode efficiency of the liquid crystal display panel of Comparative Example 4. The dark-room contrast ratio of the liquid crystal display panel of Comparative Example 4 is the ratio of the luminance in the white display state (a voltage of 7 V is applied between the common electrode 14 and the pixel electrode 16) and the luminance in the black display state (in the absence of an applied voltage) as viewed at a front viewing angle in a dark room.

As can be seen from the comparison of FIG. 10 with FIG. 9, the transmittance in the white display state of the liquid crystal display panel of Comparative Example 4 (normally black mode) is lower than those of the liquid crystal display panels (normally white mode) of Examples 1 and 2 and Comparative Examples 1 and 2 of FIG. 9.

As can be seen from Table 3, the mode efficiency of the normally black (also abbreviated to "NB") mode liquid crystal display panel of Comparative Example 4 is lower than those of the other normally white (also abbreviated to "NW") mode liquid crystal display panels. This difference attributed to the difference in operating principle between the normally black mode and the normally white mode. The mode efficiency of a normally black mode liquid crystal display panel remained substantially unchanged even when the slit structure of the pixel electrode or the anchoring energy of the alignment films was changed from the liquid crystal display panel of Comparative Example 4. For example, in the case where (L, S)=(0.5 μm, 1.0 μm) and the anchoring energy was $1\times10^{-3}$ J/m², the mode efficiency was 85%.

Figure 11:
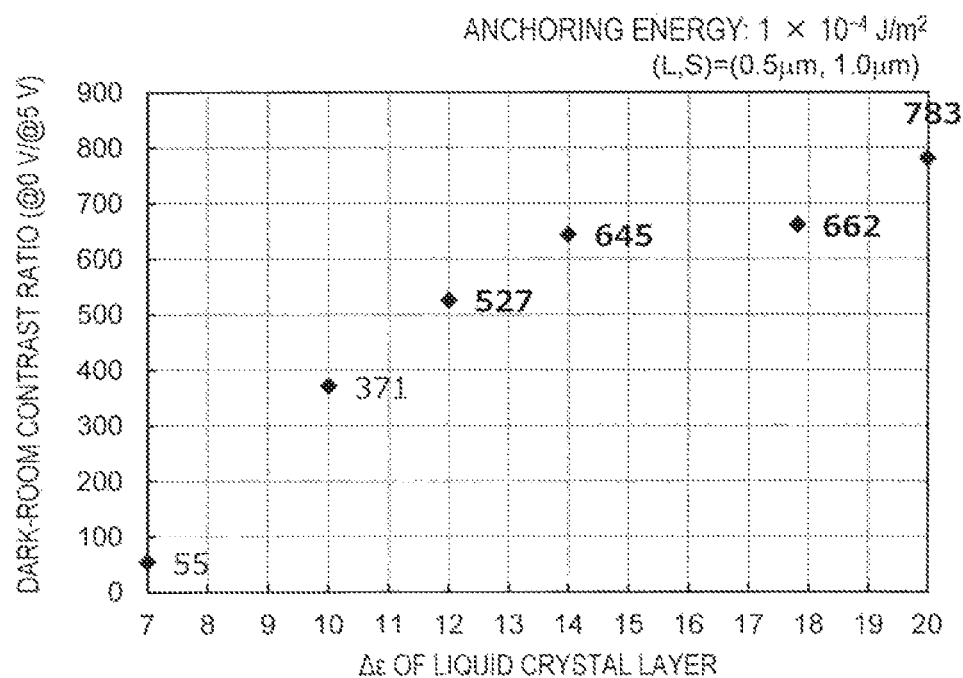
FIG. 11 is a diagram showing a relationship between a dark-room contrast ratio and the dielectric anisotropy Δε of a nematic liquid crystal material included in a liquid crystal layer 18.

FIG. 11 and Table 2 snow the results of calculating changes in dark-room contrast ratio caused by changing the dielectric anisotropy $\Delta\varepsilon$ of the nematic liquid crystal material included in the liquid crystal layer 18. The configuration used in the simulation was the same as that of the liquid crystal display panel of Example 1, except for the dielectric anisotropy $\Delta\varepsilon$ of the liquid crystal layer 18. Specifically, the slit structure had (L, S)=(0.5 μm, 1.0 μm). In addition, the first horizontal alignment film 17a and the second horizontal alignment film 17b each had an azimuthal anchoring energy of $1\times10^{-4}$ J/m². The first horizontal alignment film 17a and the second horizontal alignment film 17b also each had a polar anchoring energy of $1\times10^{-4}$ J/m².

The dark-room contrast ratio shown in FIG. 11 and Table 2 was calculated using the luminance in the black display state occurring when a voltage of 5 V was applied between the common electrode 14 and the pixel electrode 16. As shown in FIG. 11 and Table 2, in the case where the liquid crystal layer 18 contains a nematic liquid crystal material having a dielectric anisotropy $\Delta\varepsilon$ of not less than 12, a high dark-room contrast ratio (e.g., not less than 500) is obtained.

TABLE 2

| | Dielectric anisotropy Δε of liquid crystal layer | | | | | |
|---|---|---|---|---|---|---|
| | 7 | 10 | 12 | 14 | 17.8 | 20 |
| Dark-room contrast ratio (@0 V/@5 V) | 55 | 371 | 527 | 645 | 662 | 783 |

A structure of a liquid crystal display panel 100B according to another embodiment of the present invention and a liquid crystal cell 10B included in the liquid crystal display panel 100B will be described with reference to FIGS. 12A and 12B.

Figure 12A:
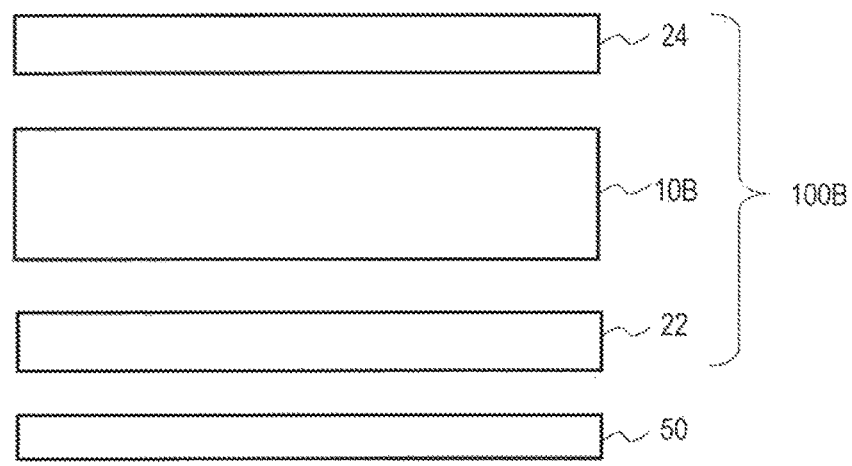
FIG. 12A is a schematic exploded cross-sectional view of a liquid crystal display panel 100B according to another embodiment of the present invention, additionally showing a backlight 50.
Figure 12B:
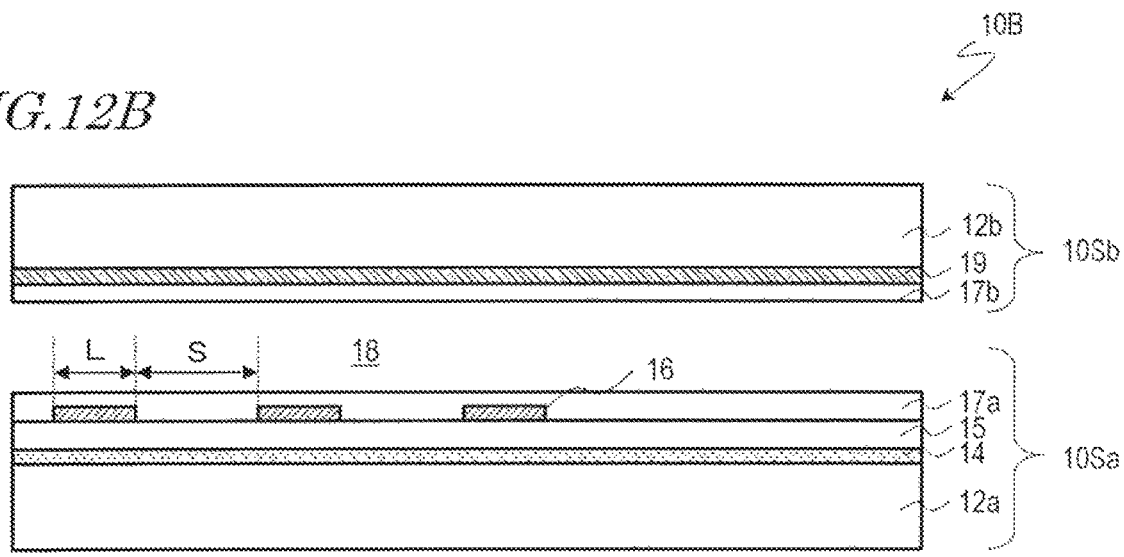
FIG. 12B is a schematic cross-sectional view of a portion corresponding to one pixel of a liquid crystal cell 10B of the liquid crystal display panel 100B.

FIG. 12A is a schematic exploded cross-sectional view of the liquid crystal display panel 100B, additionally showing a backlight 50. FIG. 12B is a schematic cross-sectional view of a portion corresponding to one pixel of the liquid crystal cell 103 of the liquid crystal display panel 100B.

As shown in FIG. 12A, the liquid crystal display panel 100B is different from the liquid crystal display panel 100A in that the liquid crystal display panel 100B has the liquid crystal cell 10B. As shown in FIG. 12B, the liquid crystal cell 10B of the liquid crystal display panel 100B is different from the liquid crystal cell 10A of the liquid crystal display panel 100A in that the second substrate (viewer-side substrate) 10Sb further has a counter electrode 19. The counter electrode 19 is facing the common electrode 14 and/or the pixel electrode 16. The counter electrode 19 may be facing only the common electrode 14. The second horizontal alignment film 17b is provided between the counter electrode 19 and the liquid crystal layer 18.

The counter electrode 19 and the common electrode 14 and/or the pixel electrode 16 together generate a vertical electric field in the liquid crystal layer 18.

The liquid crystal layer 18 of the liquid crystal cell 10B contains a nematic liquid crystal material having a positive dielectric anisotropy Δε. Although as described above, the liquid crystal display panel 100A of the preceding embodiment can be formed of a nematic liquid crystal material having either a positive or a negative dielectric anisotropy Δε, the liquid crystal layer of the liquid crystal display panel 100B is formed of a nematic liquid crystal material having a positive dielectric anisotropy Δε.

Figure 13A:
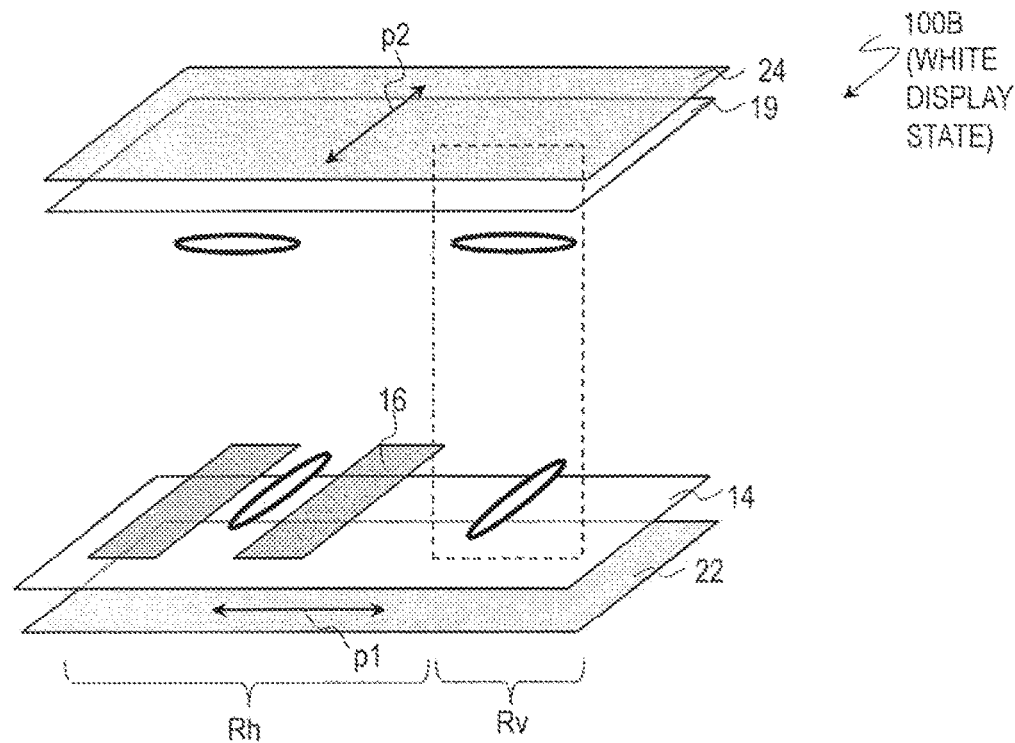
FIG. 13A is a schematic perspective view of the liquid crystal display panel 100B in the case where a voltage is not applied (white display state).
Figure 13B:
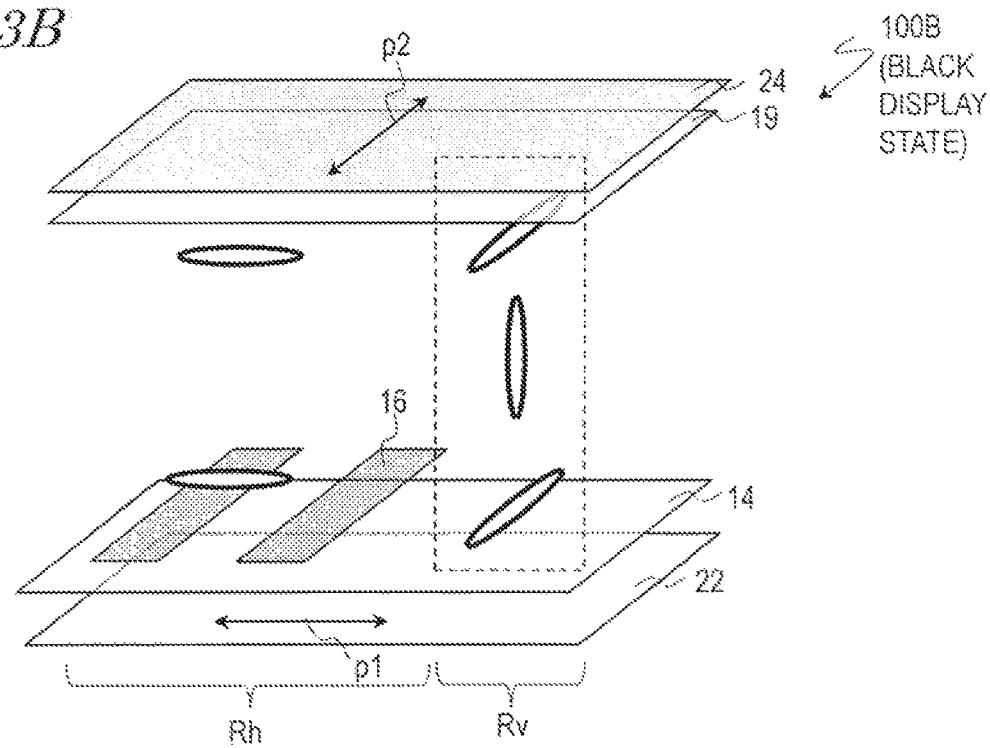
FIG. 13B is a schematic perspective view of the crystal display panel 100B in the case where the case where a voltage is applied across a liquid crystal layer (black display state).

The behavior of liquid crystal molecules that occurs when a voltage is applied across the liquid crystal layer 18 will be described with reference to FIGS. 13A and 13B. FIGS. 13A and 13B are schematic perspective views of the liquid crystal display panel 100B. FIG. 13A shows the case where a voltage is not applied (white display state), and FIG. 13B shows the case where a voltage is applied across the liquid crystal layer (black display state).

As shown in FIG. 13A, the liquid crystal layer is in a twisted alignment state in the absence of an applied voltage.

As shown in FIGS. 13A and 13B, in this example, a region corresponding to one pixel includes a region Rh where the pixel electrode 16 is provided and a region Rv where the pixel electrode 16 is not provided. In the liquid crystal layer 18 in the region Rh, a lateral electric field is mainly generated by a voltage applied between the common electrode 14 and the pixel electrode 16. In the liquid crystal layer in the region Rv, a vertical electric field is mainly generated by a voltage applied between the common electrode 14 and the counter electrode 19.

As shown in FIG. 13B, when a voltage is applied across the liquid crystal layer 18, a force is exerted on liquid crystal molecules near the first substrate 10Sa (lower substrate) in the region Rh so that the liquid crystal molecules are rotated counterclockwise. Meanwhile, the alignment azimuth of liquid crystal molecules near the second substrate 10Sb (upper substrate) remains substantially unchanged. As a result, the twist angle of the liquid crystal layer 18 is small, resulting in a state closer to a homogeneous alignment state. Meanwhile, the alignment azimuths of liquid crystal molecules in the region Rv remain substantially unchanged, and the angles (tilt angles) of the major axes of liquid crystal molecules with respect to the plane of the substrate (the plane of the liquid crystal layer) are changed. Note that liquid crystal molecules near the first substrate 10Sa (lower substrate) and the second substrate 10Sb (upper substrate) are anchored, and therefore, the tilt angles thereof remain substantially unchanged. Liquid crystal molecules at and near the center in the thickness direction of the liquid crystal layer are aligned with the major axes thereof approximately perpendicular to the plane of the substrate. As a result, the transmittance is reduced, and therefore, a better black display state is obtained.

Figure 14:
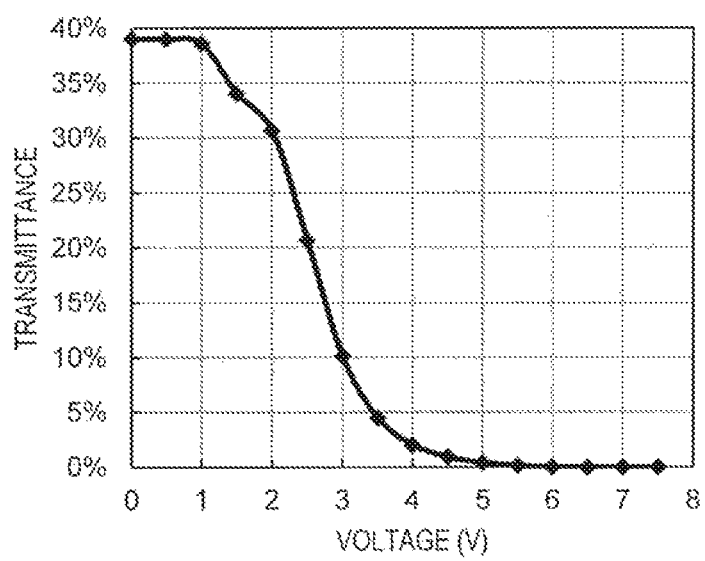
FIG. 14 is a diagram showing the transmittance of a liquid crystal display panel according to Example 3.

FIG. 14 shows the results of calculating the transmittance of a liquid crystal display panel according to Example 3 having a configuration similar to that of the liquid crystal display panel 100B.

The liquid crystal display panel of Example 3 is different from the liquid crystal display panel of Comparative Example 1 in that the former further has a counter electrode 19. The counter electrode 19 was formed of an ITO layer having a thickness of 100 nm.

In FIG. 14, the horizontal axis represents voltages applied between the common electrode 14 and the pixel electrode 16, and voltages applied between the common electrode 14 and the counter electrode 19, and the vertical axis represents transmittances of the liquid crystal display panel.

As can be seen from the comparison of FIG. 14 with FIG. 9, the transmittance in the black display state of the liquid crystal display and of Example 3 is lower than that of the liquid crystal display panel of Comparative Example 1. It is also demonstrated that although the liquid crystal display panel of Example 3 has the same slit structure and the same anchoring energy of the alignment films as those of the liquid crystal display panel of Comparative Example 1, the liquid crystal display panel of Example 3 has a contrast ratio higher than that of the liquid crystal display panel of Comparative Example 1.

Thus, it is demonstrated that in this embodiment, a high contrast ratio can be obtained even in the case where the conditions for obtaining a high contrast ratio that are described in the preceding embodiment (the anchoring energy of the horizontal alignment films and the slit structure of the pixel electrode) are not necessarily satisfied.

The dark-room contrast ratio and mode efficiency of the liquid crystal display panel of Example 3 are shown in Table 3. It is demonstrated that the dark-room contrast ratio of the liquid crystal display panel of Example 3 is 873, which is higher than that of the liquid crystal display panel of Comparative Example 1 (the dark-room contrast ratio of the liquid crystal display panel of Comparative Example 1 is 253).

Table 3 shows the structure (the slit structure of the pixel electrode 16 and the anchoring energy of the alignment films), display mode, dark-room contrast ratio, and mode efficiency of each of the liquid crystal display panels of Examples 1-3 and Comparative Examples 1-4.

TABLE 3

| Liquid crystal display panel Anchoring energy [J/m$^2$] | Example 1 $1 \times 10^{-4}$ | Example 2 $1 \times 10^{-6}$ | Example 3 $1 \times 10^{3}$ | Comparative Example 1 $1 \times 10^{3}$ | Comparative Example 2 $1 \times 10^{3}$ | Comparative Example 3 $1 \times 10^{-4}$ | Comparative Example 4 $1 \times 10^{3}$ |
|---|---|---|---|---|---|---|---|
| L [μm]/S [μm] | 0.5/1.0 | 0.5/1.0 | 0.5/1.0 | 0.5/1.0 | 2.5/3.0 | 2.5/3.0 | 2.5/3.0 |
| Display mode | NW | NW | NW | NW | NW | NW | NB |
| Contrast ratio | 986 | 1008 | 873 | 253 | 4 | 4.2 | 997 |
| Mode efficiency [%] | 91 | 90 | 91 | 91 | 91 | 90 | 79 |

Embodiments of the present invention are widely applicable to liquid crystal display panels that perform displaying in the normally white mode.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application claims priority to U.S. Provisional Patent Application No. 62/800,732 filed on Feb. 4, 2019, the disclosure of which is incorporated herein by reference.

What is claimed is:

1. A liquid crystal display panel for performing displaying in a normally white mode, comprising:
    a liquid crystal cell having a first substrate, a second substrate, and a liquid crystal layer provided between the first and second substrates;
    a first polarizer disposed on a back side of the liquid crystal cell; and
    a second polarizer disposed on a viewer side of the liquid crystal cell, wherein
    the first and second polarizers are disposed so that transmission axes thereof are perpendicular to each other,
    the liquid crystal layer is in a twisted alignment state in the absence of an applied voltage,
    the first substrate has
        a first electrode having a plurality of rectangular openings extending in parallel to each other,
        a second electrode facing the first electrode with a dielectric layer interposed therebetween, and
        a first horizontal alignment film provided between the first and second electrodes and the liquid crystal layer,
    the second substrate has a second horizontal alignment film facing the first horizontal alignment film with the liquid crystal layer interposed therebetween,
    the plurality of rectangular openings each independently have a width S of more than 0.6 μm and not more than 1.4 μm, and each pair of adjacent ones of the plurality of rectangular openings independently has a distance L therebetween of not less than 0.3 μm and not more than 0.7 μm, and
    the first and second horizontal alignment films each have an azimuthal anchoring energy of not more than $1 \times 10^{-4}$ J/m$^2$.

2. A liquid crystal display panel for performing displaying in a normally white mode, comprising:
    a liquid crystal cell having a first substrate, a second substrate, and a liquid crystal layer provided between the first and second substrates;
    a first polarizer disposed on a back side of the liquid crystal cell; and
    a second polarizer disposed on a viewer side of the liquid crystal cell, wherein
    the first and second polarizers are disposed so that transmission axes thereof are perpendicular to each other,
    the liquid crystal layer is in a twisted alignment state in the absence of an applied voltage,
    the first substrate has
        a first electrode having a plurality of rectangular openings extending in parallel to each other,
        a second electrode facing the first electrode with a dielectric layer interposed therebetween, and
        a first horizontal alignment film provided between the first and second electrodes and the liquid crystal layer,
    the second substrate has
        a third electrode facing the first and/or second electrodes, and
        a second horizontal alignment film provided between the third electrode and the liquid crystal layer, and facing the first horizontal alignment film with the liquid crystal layer interposed therebetween, and
    the plurality of rectangular openings each independently have a width S of not less than 0.8 μm and not more than 1.0 μm, and each pair of adjacent ones of the plurality of rectangular openings independently has a distance L therebetween of not less than 0.4 μm and not more than 0.6 μm.

3. The liquid crystal display panel of claim 1, wherein the plurality of rectangular openings each independently have a width S of not less than 0.8 μm and not more than 1.0 μm, and each pair of adjacent ones of the plurality of rectangular openings independently has a distance L therebetween of not less than 0.4 μm and not more than 0.6 μm.

4. The liquid crystal display panel of claim 1, wherein the liquid crystal layer has a twist angle of not less than 85° and not more than 90° in the absence of an applied voltage.

5. The liquid crystal display panel of claim 1, wherein an angle between an alignment azimuth determined by the second horizontal alignment film and the transmission axis of the first or second polarizer is not less than 89.7° and not more than 90.3°.

6. The liquid crystal display panel of claim 1, wherein a pretilt angle determined by the first horizontal alignment film and a pretilt angle determined by the second horizontal alignment film are each 0°.

7. The liquid crystal display panel of claim 1, wherein the first and second horizontal alignment films are each a photoalignment film.

8. The liquid crystal display panel of claim 1, wherein the liquid crystal layer contains a nematic liquid crystal material having a dielectric anisotropy Δε of not less than 12.

9. The liquid crystal display panel of claim 1, wherein the first and second horizontal alignment films each have a polar anchoring energy of not more than $1\times10^{-4}$ J/m$^2$.

10. The liquid crystal display panel of claim 1, wherein the first electrode is located closer to the liquid crystal layer than is the second electrode.

11. The liquid crystal display panel of claim 1, wherein $\Delta n \times d$ is not less than 420 nm and not more than 480 nm where $\Delta n$ represents a birefringence of a nematic liquid crystal contained in the liquid crystal layer, and d indicates a thickness of the liquid crystal layer.

12. The liquid crystal display panel of claim 2, wherein the liquid crystal layer has a twist angle of not less than 85° and not more than 90° in the absence of an applied voltage.

13. The liquid crystal display panel of claim 2, wherein an angle between an alignment azimuth determined by the second horizontal alignment film and the transmission axis of the first or second polarizer is not less than 89.7° and not more than 90.3°.

14. The liquid crystal display panel of claim 2, wherein a pretilt angle determined by the first horizontal alignment film and a pretilt angle determined by the second horizontal alignment film are each 0°.

15. The liquid crystal display panel of claim 2, wherein the first and second horizontal alignment films are each a photoalignment film.

16. The liquid crystal display panel of claim 2, wherein the liquid crystal layer contains a nematic liquid crystal material having a dielectric anisotropy $\Delta\varepsilon$ of not less than 12.

17. The liquid crystal display panel of claim 2, wherein the first and second horizontal alignment films each have a polar anchoring energy of not more than $1\times10^{-4}$ J/m$^2$.

18. The liquid crystal display panel of claim 2, wherein the first electrode is located closer to the liquid crystal layer than is the second electrode.

19. The liquid crystal display panel of claim 2, wherein $\Delta n \times d$ is not less than 420 nm and not more than 480 nm where $\Delta n$ represents a birefringence of a nematic liquid crystal contained in the liquid crystal layer, and d indicates a thickness of the liquid crystal layer.

* * * * *